(12) United States Patent
Gonzalez et al.

(10) Patent No.: US 10,203,010 B2
(45) Date of Patent: Feb. 12, 2019

(54) METHOD FOR VENTILATING BRAKE DISCS OF AN AIRCRAFT WHEEL

(71) Applicant: SAFRAN LANDING SYSTEMS, Velizy Villacoublay (FR)

(72) Inventors: Vincent Gonzalez, Velizy-Villacoublay (FR); Arnaud Gapin, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 15/248,331

(22) Filed: Aug. 26, 2016

(65) Prior Publication Data

US 2017/0058981 A1 Mar. 2, 2017

(30) Foreign Application Priority Data

Aug. 27, 2015 (FR) ...................................... 15 57958

(51) Int. Cl.
| F16D 65/847 | (2006.01) |
|---|---|
| B64C 25/42 | (2006.01) |
| B60T 5/00 | (2006.01) |
| F16D 55/36 | (2006.01) |

(52) U.S. Cl.
CPC .............. F16D 65/847 (2013.01); B60T 5/00 (2013.01); B64C 25/42 (2013.01); *F16D 55/36* (2013.01)

(58) Field of Classification Search
CPC .... F16D 65/847; F16D 65/807; F16D 65/827; B60T 5/00
USPC ...................................... 188/264 A, 264 AA
See application file for complete search history.

(56) References Cited

U.S. PATENT DOCUMENTS

| 3,142,360 A | * | 7/1964 | Ladislav | ................. B64C 25/42 |
| | | | | 188/264 AA |
| 3,251,437 A | * | 5/1966 | Moyer | .................... F16D 55/40 |
| | | | | 188/264 AA |
| 3,664,467 A | * | 5/1972 | Lucien | .................. F16D 65/847 |
| | | | | 188/264 AA |
| 3,983,974 A | * | 10/1976 | Dowell | ................... B60T 1/065 |
| | | | | 188/264 AA |
| 4,592,452 A | * | 6/1986 | Merle | ................... F16D 65/847 |
| | | | | 188/264 AA |

(Continued)

FOREIGN PATENT DOCUMENTS

| DE | 1113149 B | 8/1961 |
| EP | 0483719 A1 | 5/1992 |
| FR | 1439992 A | 5/1966 |

OTHER PUBLICATIONS

French Search Report and Written Opinion, issued by the French Republic National Institute of Industrial Property in corresponding French Application No. FR1557958, dated Jul. 14, 2016.

*Primary Examiner* — Thomas W Irvin
(74) *Attorney, Agent, or Firm* — Sughrue Mion, PLLC

(57) ABSTRACT

A method for ventilating discs (11) of a brake (10) fitted to an aircraft wheel (1) having a rim (2) mounted so as to rotate on an axle (4) of a landing gear of the aircraft. The brake discs are threaded onto a torsion tube (12) of the brake which extends around the axle. The method comprises the step of integrating a compressor (20; 30; 40) into a space extending inside the torsion tube in order to draw in air beneath the torsion tube and to return the air thus drawn in by the compressor over the torsion tube towards the brake discs.

11 Claims, 6 Drawing Sheets

(56) References Cited

U.S. PATENT DOCUMENTS

| | | | | |
|---|---|---|---|---|
| 5,215,168 | A * | 6/1993 | Guiot | B61H 5/00 |
| | | | | 188/264 A |
| 9,573,570 | B2 * | 2/2017 | Mueller | B64C 25/405 |
| 2003/0047394 | A1 * | 3/2003 | Hayes | F16D 65/10 |
| | | | | 188/264 AA |
| 2012/0104159 | A1 * | 5/2012 | Charles | B64C 25/405 |
| | | | | 244/50 |

\* cited by examiner

METHOD FOR VENTILATING BRAKE DISCS OF AN AIRCRAFT WHEEL

The invention relates to a method for ventilating brake discs of an aircraft wheel.

TECHNOLOGICAL BACKGROUND OF THE INVENTION

Already known are aircraft whose wheels equipped with a brake are provided with a ventilator that can be controlled so as to cool the brake discs in order to rapidly lower their temperature and thus avoid any delay to the departure of the aircraft for a new cycle. In general, the body of the ventilator is engaged inside the axle bearing the wheel, and its turbine draws in the air through openings in the rim of the wheel. However, the ventilator arranged in this manner takes up a lot of space in the axle such that the spindle of the wheel speed sensor for measuring the speed of rotation of the wheel is elongated in order to pass through the ventilator and reach the wheel. Thus, this diminishes the measurements taken by the wheel speed sensor.

Also known, in particular in the automotive field, are turbines secured to the rim of the wheel in order to draw in air through the rim of the wheel. These turbines are for example integrated into a hub cap attached to the rim.

OBJECT OF THE INVENTION

The invention has the object of proposing a method for ventilating brake discs of an aircraft wheel without either monopolizing the interior of the axle or obscuring the rim.

PRESENTATION OF THE INVENTION

With a view to achieving this object, what is proposed is a method for ventilating discs of a brake fitted to an aircraft wheel having a rim mounted so as to rotate on an axle of a landing gear of the aircraft, the brake discs being threaded onto a torsion tube of the brake which extends around the axle, the method comprising the step of integrating a compressor into a space extending inside the torsion tube in order to draw in air beneath the torsion tube and to return the air thus drawn in by the compressor over the torsion tube towards the brake discs.

Thus, the compressor is completely integrated into the wheel, extending within a space located between the torsion tube and the axle, and therefore does not occupy the interior of the axle which is then free to receive a wheel speed sensor, and leaves the rim free for visual inspection thereof and access to the inflation valve. Advantageously, the wheel speed sensor may have a relatively small spindle, making it possible to improve the quality of its measurements.

DESCRIPTION OF THE FIGURES

The invention will be better understood in light of the following description, with reference to the figures of the appended drawings, in which.

DETAILED DESCRIPTION OF EMBODIMENTS OF THE INVENTION

Figure 1:
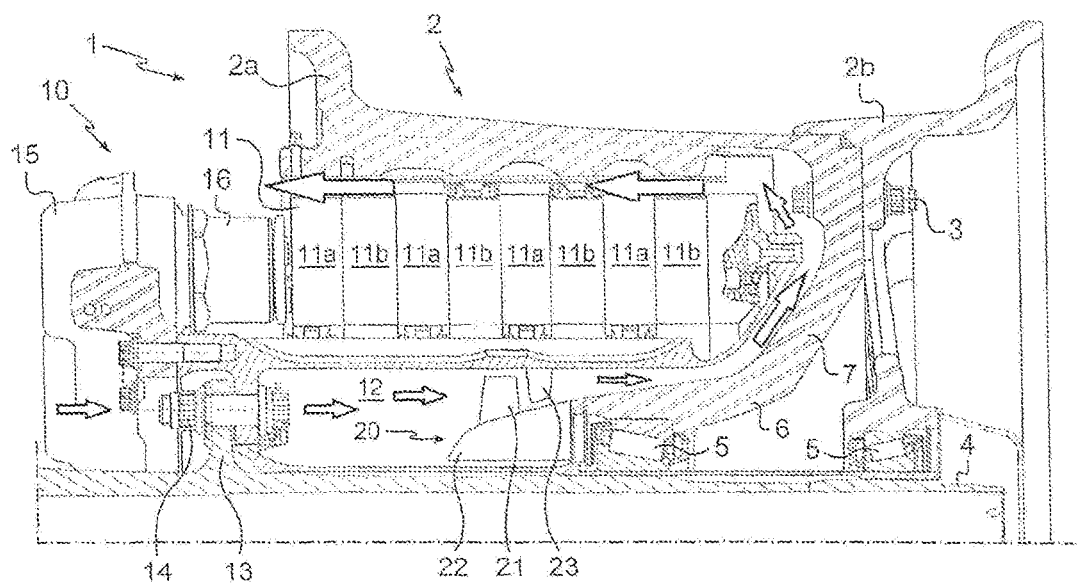
FIG. 1 is a view in axial section of a wheel rim that is mounted on an axle of an aircraft landing gear and that is equipped, according to a first embodiment of the invention, with an axial compressor installed between the torsion tube and the axle.

The invention is relevant to an aircraft wheel 1 comprising a rim 2, in this case comprising two half-rims 2a, 2b that are assembled by bolts 3, and is mounted so as to rotate on an axle 4 by means of rolling element bearings 5 borne by a hub 6 of the rim 2. The wheel 1 is equipped with a brake 10 comprising brake discs 11, including stator discs 11a and rotor discs 11b, that are threaded onto a torsion tube 12 fixed to an axle flange 13 by means of bolts 14. The brake 10 comprises a support 15 for braking actuators 16 that are able to selectively apply a braking force to the stack of discs 11.

Figure 2:
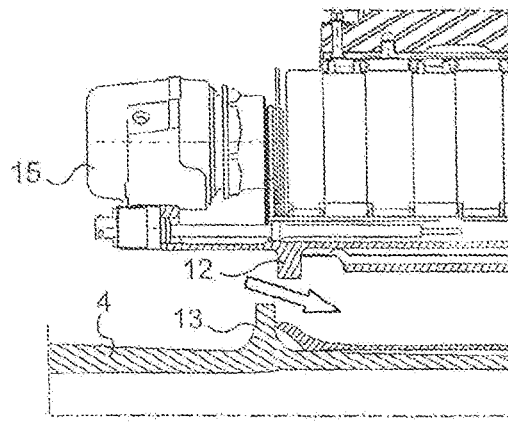
FIG. 2 is a partial section in another plane of the rim of FIG. 1, showing the air passages that supply the compressor.

In accordance with a first embodiment of the invention, shown in FIG. 1, there is arranged inside the torsion tube 12 an axial compressor 20 comprising rotary blades 21 mounted on a ring 22 that is secured to the rim 2 and thus rotates with the wheel, and fixed stator vanes 23 that are secured to the torsion tube. Air is drawn in by the compressor 20 via the spaces between the torsion tube 12 and the axle flange 13 (shown in FIG. 2), is delivered towards the interior of the rim and is pushed over the torsion tube 12 between the brake discs 11 and the rim 2 to exit over the braking actuators 16. Thus, the air passes along a circuit within the half-rim 2a, on either side of the torsion tube 12, as indicated by the arrows in the figure.

It will be noted that the web 7 of the half-rim 2a which extends so as to connect the hub 6 to the rest of the rim is closed and comprises no aeration openings that would allow the air flows to escape through the rim to the outside. This absence of alveoli simplifies the design of the rim. The half-rim 2a then acts as a deflector which forces the flow of air coming from the compressor 20 towards the brake discs 11.

Figure 3:
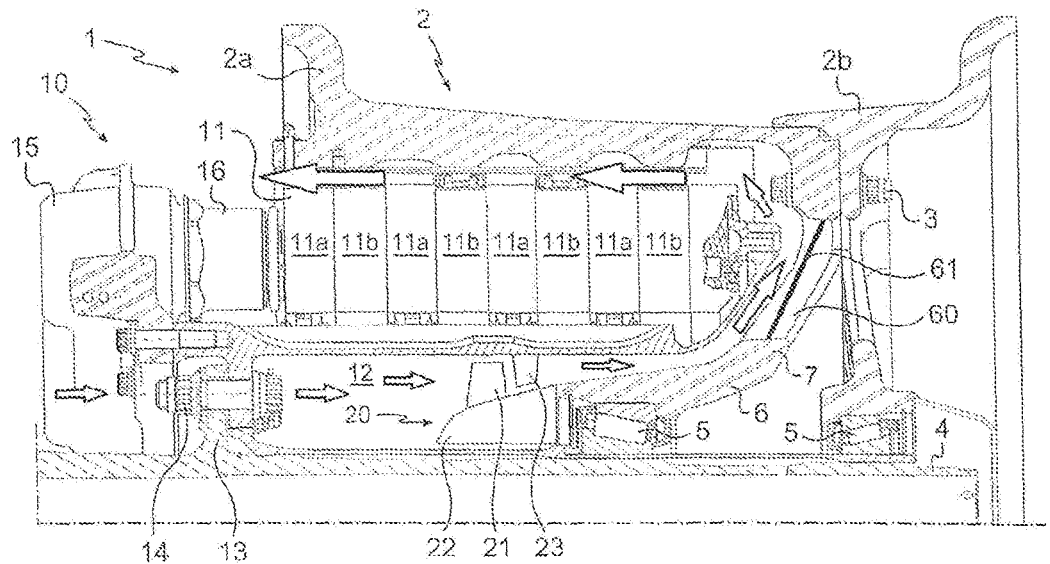
FIG. 3 is a view, similar to that of FIG. 1, of a first variant of the first embodiment, in which the rim comprises openings that are blocked.

With reference to FIG. 3, according to a first variant of the first embodiment, the rim 2 comprises in this case aeration openings 60 in the web 7 of the half-rim 2a, which are again called ventilation alveoli. These aeration openings 60 comprise, in this case, covers 61 that are able to block the openings. Thus, in spite of the presence of the aeration openings 60, the air flow cannot escape through the rim to the outside. Thus, the air passes along a circuit inside the half-rim 2a on either side of the torsion tube 12, as indicated by the arrows in FIG. 3.

Figure 4:
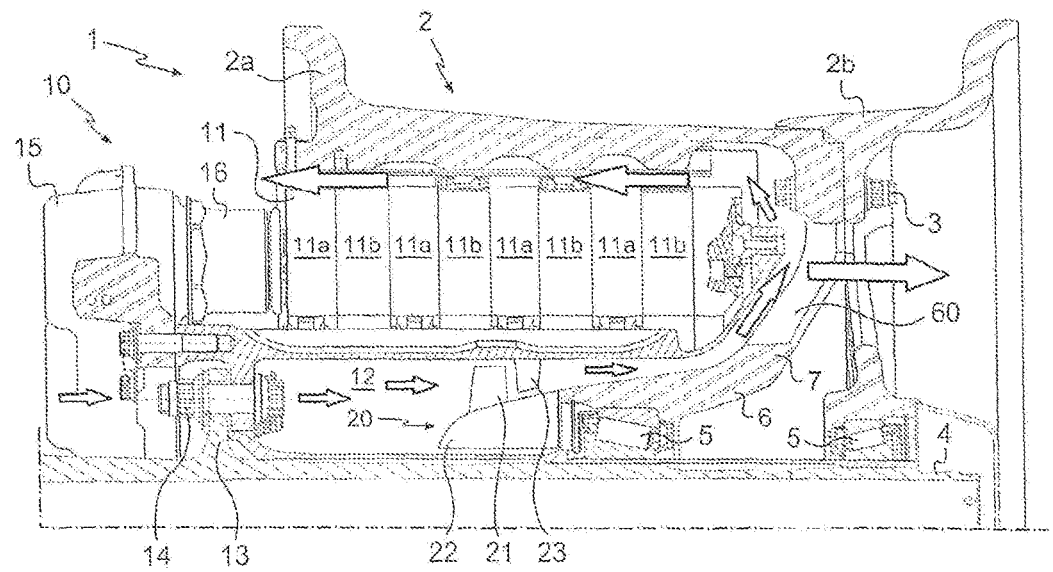
FIG. 4 is a view, similar to that of FIG. 1, of a second variant of the first embodiment, in which the rim comprises openings that are not blocked.

With reference to FIG. 4, according to a second variant of the first embodiment, the rim 2 comprises in this case aeration openings 60 in the web 7 of the half-rim 2a.

In this case, the aeration openings 60 comprise no cover, such that part of the flow escapes through the rim to the outside, the other part of the flow of air being pushed between the brake discs 11 and the rim 2 to exit over the braking actuators 16.

Figure 5:
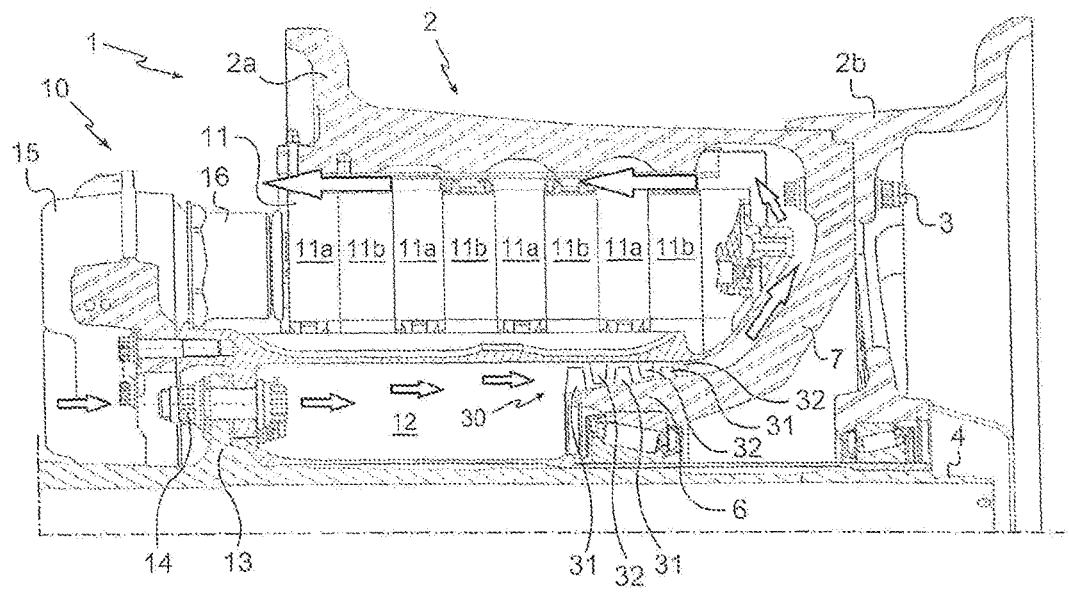
FIG. 5 is a view, similar to that of FIG. 1, of a second embodiment, in which an axial compressor is installed between the torsion tube and a hub portion of the rim.

According to a second embodiment of the invention, shown in FIG. 5, the axial compressor 30 is still installed inside the torsion tube 12, but in this case it extends more precisely between the torsion tube 12 and the hub 6 of the rim 2. In this case, the turbine 30 comprises three successive stages, each comprising rotating blades 31 followed by fixed stator vanes 32. The operation of the axial compressor 30 is identical to that of the axial compressor 20.

As was the case for the variants of the first embodiment, the web 7 of the half-rim 2a may, as a variant, comprise openings that are obstructed or not.

Figure 6:
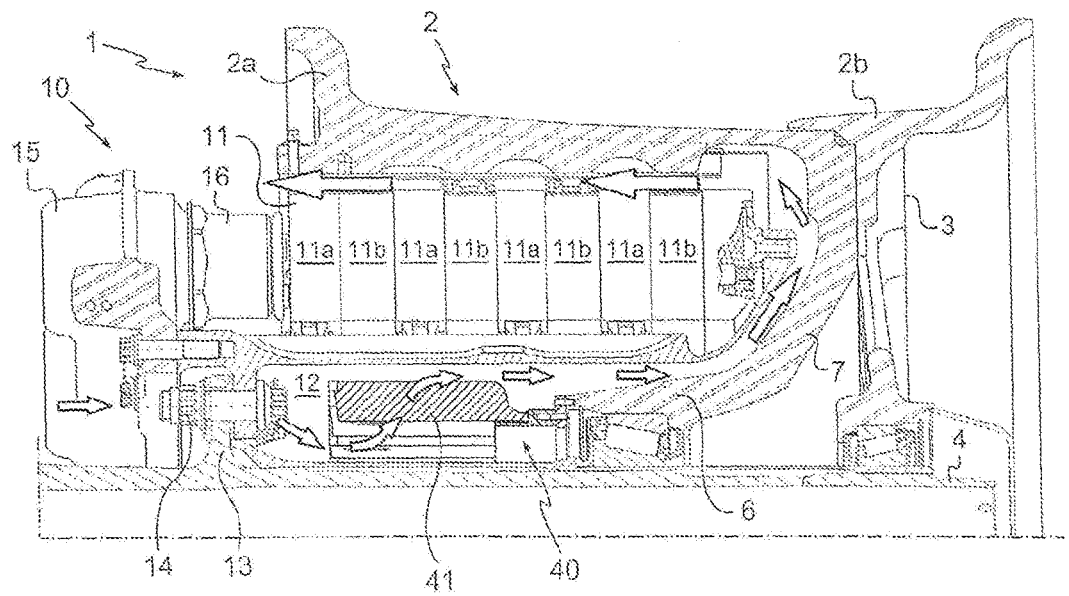
FIG. 6 is a view, similar to that of FIG. 1, of a third embodiment of the invention, implementing a centrifugal compressor installed between the torsion tube and the axle.
Figure 7:
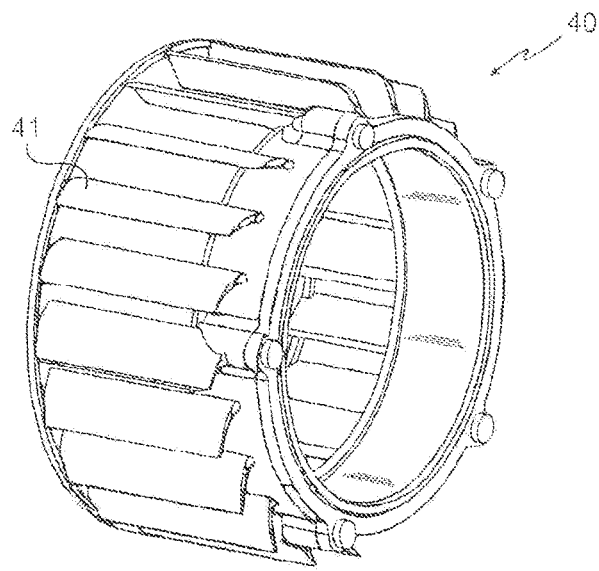
FIG. 7 is a perspective view of the bladed wheel of the compressor of FIG. 6.

According to a third embodiment, illustrated in FIGS. 6 and 7, the wheel is now equipped with a centrifugal (or radial) compressor 40 which still extends inside the torsion tube 12. In this case, the compressor 40 is a compressor comprising a bladed wheel 41 (here, only one blade is provided with a reference) that rotates as one with the wheel. The bladed wheel draws in air over all 360 degrees of the interior diameter of the bladed wheel 41. The compressed air is then ejected by the compressor 40 over all 360 degrees of the exterior diameter of the compressor, and thus in part towards the torsion tube 12, wherein the air then escapes by passing over the torsion tube 12 between the rim and the brake discs, as before.

As was the case for the variants of the first embodiment, the web 7 of the half-rim 2a may, as a variant, comprise openings that are obstructed or not.

Figure 8:
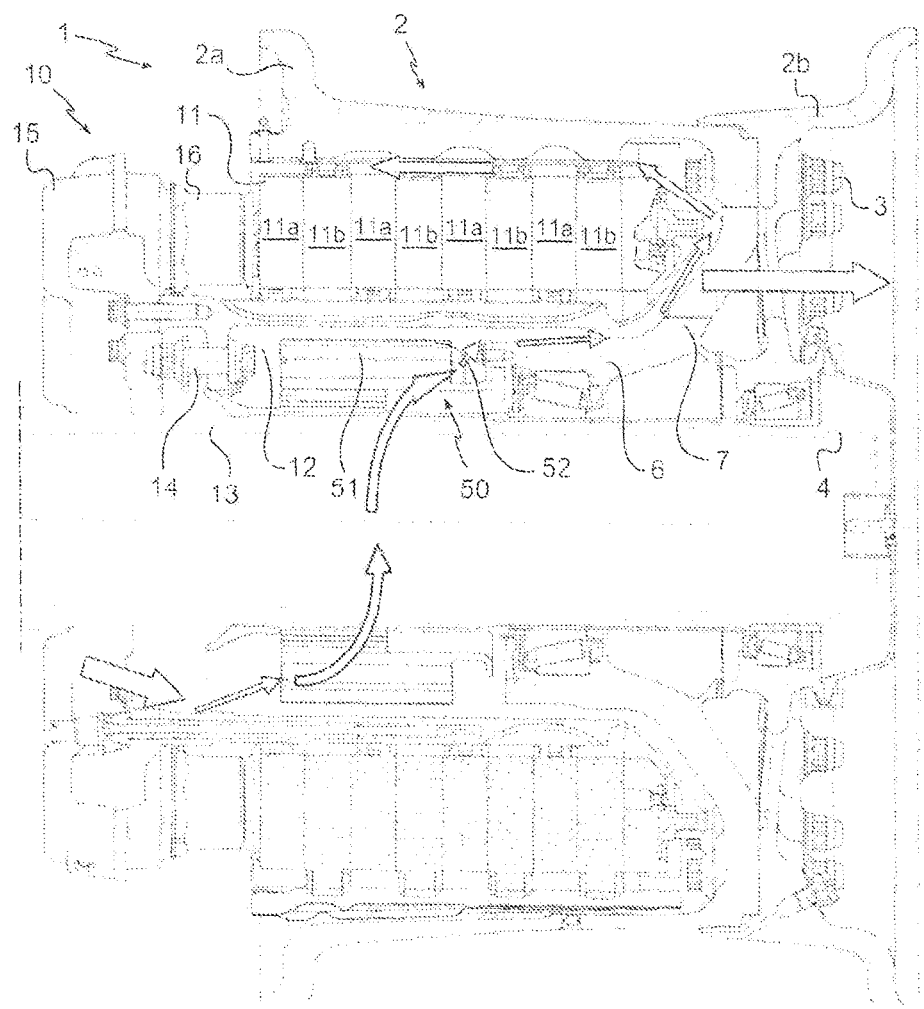
FIG. 8 is a view, similar to that of FIG. 4, of a fourth embodiment of the invention, using a volute.
Figure 9:
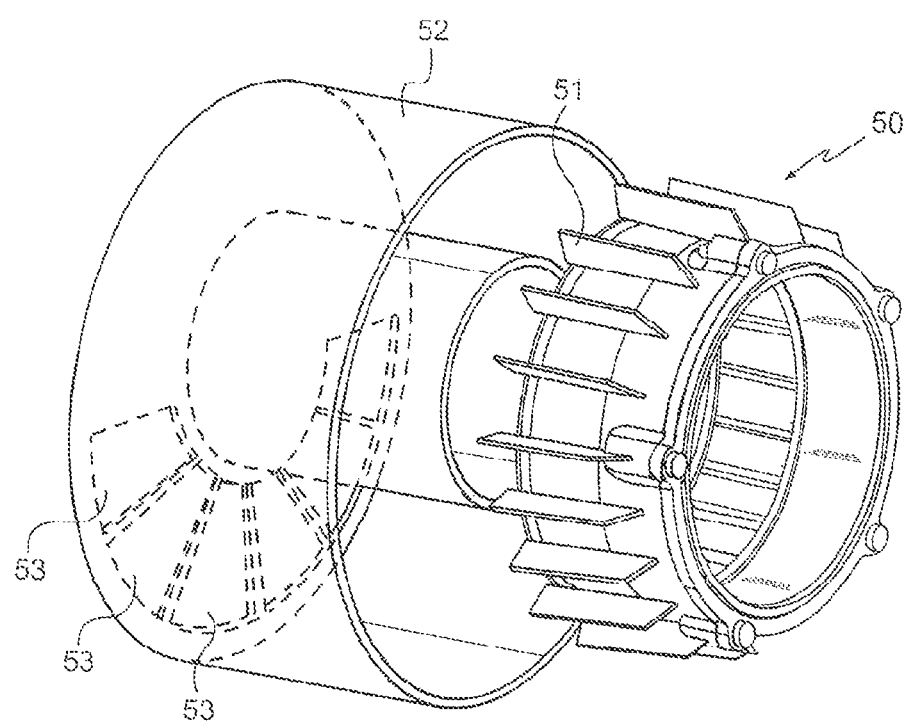
FIG. 9 is a perspective view of the volute and of the bladed wheel of FIG. 8.

According to a fourth embodiment, illustrated in FIGS. 8 and 9, the compressor 50 is still of the centrifugal type but now comprises a bladed wheel 51 and a volute 52, with the bladed wheel 51 rotating inside the volute 52. The volute 52 is in this case axially offset with respect to the bladed wheel 51. In this case, the volute 52 comprises air inlets 53 in its widest portion.

It can be seen here that the web 7 of the half-rim 2a comprises aeration openings 50 that are not obstructed.

By virtue of the centrifugal action of the compressor 50, the air is drawn in by the lower portion of the compressor 50 at the openings 53 of the volute 52, and is expelled over all 360 degrees of the exterior diameter of the compressor 50 so as to be delivered towards the interior of the rim. Then:

the minority of the air is pushed over the torsion tube 12 between the brake discs and the rim 2, to exit over the braking actuators 16, and the majority of the air is pushed towards the outside through the aeration openings 60.

Thus, the air passes along a circuit inside the half-rim 2a on either side of the axle 4 and then on either side of the torsion tube, as indicated by the arrows in FIG. 8.

Figure 10:
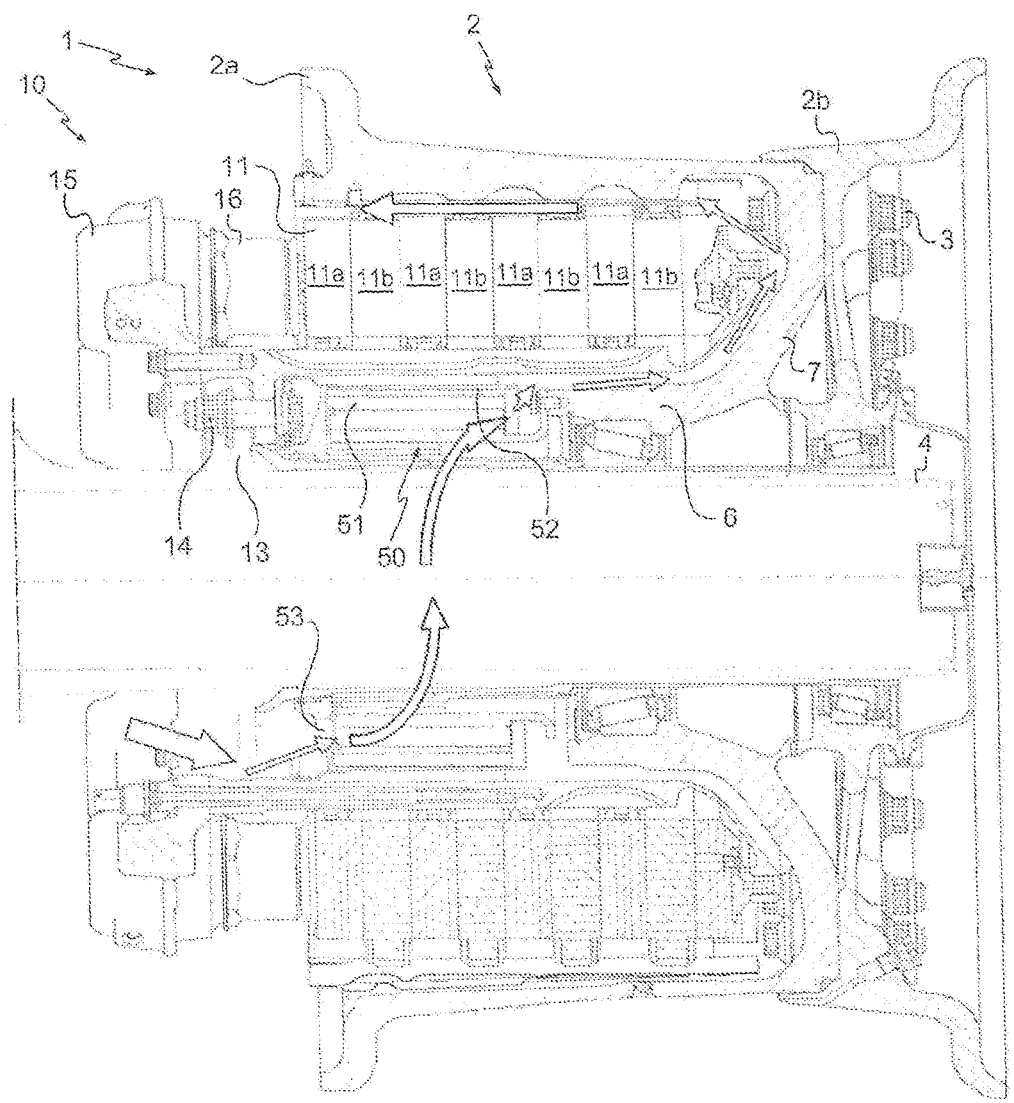
FIG. 10 is a view, similar to that of FIG. 1, of a variant of the fourth embodiment of the invention, in which the web of the half-rim is closed.

As a variant, and as shown in FIG. 10, the web 7 of the half-rim 2a is closed such that the air exits only at the braking actuators. Alternatively, the web might comprise aeration openings that are completely or partially obstructed by covers.

The invention is not restricted to that which has just been described, but rather encompasses any variant that falls within the scope defined by the claims.

In particular, although here the moving parts of the compressors rotate with the wheel, they may be motorized so as to rotate independently of the wheel.

Although the air drawn in by the compressor is returned over the torsion tube by the closed web of the wheel, it is possible to use wheels whose rims have openings (ventilation alveoli), possibly adapting a lightweight cover that is able to block these openings.

Although in this case the rotating blades are followed by stator vanes, the latter can be omitted such that the compressor then comprises only rotating blades.

In the case of the compressor comprising blades, these may equally be straight blades or blades which are curved, preferably in the preferred direction of rotation of the wheel.

Also, in the case of the compressor comprising blades, these may equally be short or long, whatever the compressor used.

In the case of a radial compressor, this may be designed such that the air is drawn in over all 360° of its inlet opening, or such that the air is drawn in only across an angular sector of its inlet opening. Preferably, the angular sector will then be arranged such that the compressor draws in air from its lower portion.

Furthermore, in the case of a radial compressor, this may be designed such that the compressed air is expelled over all 360° of its outlet opening, or such that the compressed air is expelled only across an angular sector of its outlet opening. Preferably, the angular sector will then be arranged such that the compressor expels the compressed air from its upper portion towards the top of the torsion tube and the upper web of the rim.

In the case of a radial compressor, as with an axial compressor, the method may comprise the additional step of associating a multiplier with the compressor, for example by arranging the multiplier between the wheel and the compressor.

The invention claimed is:

1. A method for ventilating discs (11) of a brake (10) fitted to an aircraft wheel (1) having a rim (2) mounted so as to rotate on an axle (4) of a landing gear of the aircraft, the brake discs being threaded onto a torsion tube (12) of the brake which extends around the axle, the method comprising:

integrating a compressor into a space extending inside the torsion tube in order to draw in air beneath the torsion tube and to return the air thus drawn in by the compressor over the torsion tube towards the brake discs, the compressor comprising rotary blades mounted on a ring that is secured to the rim to rotate with said rim.

2. The method according to claim 1, in which the compressor is of the axial type and comprises at least one stage comprising rotating blades (21; 31) followed by fixed stator vanes (22; 32).

3. The method according to claim 1, in which the compressor is of the centrifugal type.

4. The method according to claim 3, in which the compressor is designed such that it draws in air only in its lower portion.

5. The method according to claim 3, in which the compressor is designed such that it ejects compressed air only in its upper portion over the torsion tube.

6. The method according to claim 3, in which the compressor comprises a bladed wheel (51) associated with a volute (52) of the compressor.

7. The method according to claim 1, in which the rim comprises a closed web (7) that is able to redirect a flow of air generated by the compressor towards the brake discs.

8. The method according to claim 1, in which the rim comprises openings in the web (7).

9. The method according to claim 8, in which the openings (60) comprise covers (61) that are able to at least partially block said openings.

10. The method according to claim 1, in which the compressor comprises straight blades.

11. The method according to claim 1, in which the compressor comprises curved blades.

* * * * *